(12) United States Patent
Frank et al.

(10) Patent No.: US 7,379,105 B1
(45) Date of Patent: May 27, 2008

(54) MULTI-STANDARD VIDEO IMAGE CAPTURE DEVICE USING A SINGLE CMOS IMAGE SENSOR

(75) Inventors: Michael Frank, Sunnyvale, CA (US); David Kuo, San Jose, CA (US)

(73) Assignee: PIXIM, Inc., Mountain View, CA (US)

( * ) Notice: Subject to any disclaimer, the term of this patent is extended or adjusted under 35 U.S.C. 154(b) by 775 days.

(21) Appl. No.: 10/174,868

(22) Filed: Jun. 18, 2002

(51) Int. Cl.
*H04N 9/64* (2006.01)
*H04N 11/20* (2006.01)
*H04N 7/01* (2006.01)
*H04N 3/14* (2006.01)
*H04N 5/335* (2006.01)

(52) U.S. Cl. .................. 348/242; 348/272; 348/445; 382/279; 382/299; 382/300

(58) Field of Classification Search ............ 348/242, 348/250, 252, 272, 273, 279, 441, 443, 445, 348/454
See application file for complete search history.

(56) References Cited

U.S. PATENT DOCUMENTS

| | | | | |
|---|---|---|---|---|
| 4,774,565 A | * | 9/1988 | Freeman | 348/242 |
| 5,202,756 A | * | 4/1993 | Sasaki et al. | 348/223.1 |
| 5,262,849 A | * | 11/1993 | Mimura et al. | 348/224.1 |
| 5,450,129 A | * | 9/1995 | Matoba et al. | 348/294 |
| 5,537,157 A | * | 7/1996 | Washino et al. | 348/722 |
| 5,917,556 A | * | 6/1999 | Katayama | 348/655 |
| 6,236,433 B1 | * | 5/2001 | Acharya et al. | 348/273 |
| 6,510,178 B1 | * | 1/2003 | Fimoff et al. | 375/240.17 |
| 6,765,616 B1 | * | 7/2004 | Nakano et al. | 348/322 |
| 6,774,943 B1 | * | 8/2004 | Kao et al. | 348/252 |
| 6,801,250 B1 | * | 10/2004 | Miyashita | 348/220.1 |
| 6,876,386 B1 | * | 4/2005 | Ito | 348/240.1 |

OTHER PUBLICATIONS

"Digital Multistandard Camera", Hitachi information page, downloaded from http://www.hitachi.com/products/information/electronic2/broadcasting/halp-ZZ . . . (printed May 13, 2002).

\* cited by examiner

*Primary Examiner*—Ngoc-Yen Vu
*Assistant Examiner*—Carramah J Quiett
(74) *Attorney, Agent, or Firm*—Patent Law Group LLP; Carmen C. Cook

(57) ABSTRACT

A video image capture device includes an image sensor including an two-dimensional array of pixel elements overlaid with a pattern of color filters and having a vertical resolution different from the vertical resolutions specified for a group of video formats, a frame buffer for storing digital pixel data outputted by the image sensor, and an interpolator module for interpolating the digital pixel data to generate video data in at least three color planes and having a vertical resolution corresponding to a video format selected from the group of video formats. In one embodiment, the group of video formats includes the NTSC and PAL video formats. The vertical resolution of the image sensor has a value between the vertical resolution of the NTSC and PAL video formats. The interpolator module performs interpolation using a set of combined filters, each of the combined filters incorporating a demosaic filter and a scaling filter.

31 Claims, 10 Drawing Sheets

MULTI-STANDARD VIDEO IMAGE CAPTURE DEVICE USING A SINGLE CMOS IMAGE SENSOR

FIELD OF THE INVENTION

The invention relates to video image data processing, and more particularly to a video camera using a single image sensor to capture video images while providing video signals in multiple video image standards.

DESCRIPTION OF THE RELATED ART

Currently, NTSC and PAL are two television standards that are widely used in the world. The NTSC (National Television Standards Committee) television standard, used primarily in the North America countries with a 60 Hz power grid, uses a frame rate of 30 frames per second (odd/even field interlaced) and 525 scan lines in a full frame of TV signals. The PAL (Phase Alternate Lines) television standard, used primarily in Europe and Asia with a 50 Hz power grid, uses a frame rate of 25 frames per second (odd/even field interlaced) and 625 scan lines in a full frame of TV signals.

FIG. 1 illustrates the raster scan operation of a television display according to either the NTSC or PAL standard. Both the NTSC and PAL standards use interlacing where each frame of a television image is displayed in an odd field and an even field such that alternate lines of the full frame image is displayed in each field. A full frame video image includes a horizontal blanking region and a vertical blanking region. Under the CCIR 601 standard, the NTSC video format has up to 858 pixels in each of 525 scan lines, but only 720 active pixels in the horizontal direction and 480 active pixels in the vertical direction to give the 4:3 aspect ratio of the television display. On the other hand, in the PAL video format, although there are up to 864 pixels in each of 625 scan lines, there are only 720 active pixels in the horizontal direction and 576 active pixels in the vertical direction. Other standards, such as those promulgated by the International Telecommunication Union (ITU), may have other specification for scan lines and active pixels for the NTSC or PAL video format.

The differences in field rate, scan rate and other specification of the different television standards give rise to incompatibilities in video formats such that video recording equipments or video display equipments are typically manufactured dedicated to a specific standard. Video images recorded using one television standard (or video format) cannot be displayed on viewing equipment supporting another standard without first converting the video recordings to the other standard.

Standard converters used to convert recordings from an original video format to a destination video format are known. These standard converters are technically complex and expensive. For example, computationally intensive motion estimation algorithms are often used to interpolate video image data between frames of image data in order to generate final images having smooth motion. Standard converters are mostly used only by television broadcast stations to convert broadcast signals from foreign countries to the television standard of the local country. Multi-standard VCRs and televisions are also known. These multi-standard machines operate to display the video images in the video format in which the images were recorded and do not perform any conversion of the images.

Conventional video cameras are typically manufactured for a specific TV standard. This is primarily because the different numbers of scan lines per frame in the different video standards dictate differently shaped pixels for each standard. For example, under the CCIR 601 standard for digital standard television signals, the aspect ratio for pixels in the PAL format is 1:0.94 to provide 720:576 active pixels in a full frame image. On the other hand, the aspect ratio for pixels in the NTSC format is 1:1.125 to provide 720:480 active pixels in a full frame image. In conventional video cameras, separate image sensors are developed for the NTSC and the PAL standards to accommodate the different aspect ratios required for the pixels. Thus, conventional video cameras are dedicated equipment and support only one television standard in recording and display.

A camcorder/still image camera that uses a high resolution image sensor (e.g. greater than 1 Megapixels) to record images and down-sample the recorded signals vertically and horizontally to generate video images in either the PAL or the NTSC standard is known. However, this solution is undesirable because the high resolution image sensor can be very costly and the down-sample processing can require large memory space to implement. Also, because size of the image sensor determines the size of the optics to be used, a high resolution image sensor would require optics having larger sizes than the sizes of commercially available optics. The requirements for custom-made optics increases the cost of the camera. Alternately, if smaller pixels are used in the high resolution image sensor to limit the size of the sensor, the sensitivity of the image sensor is also lowered.

Therefore, it is desirable for a video image capture device capable of generating video image data compatible with a number of video standards.

SUMMARY OF THE INVENTION

According to one embodiment of the present invention, a video image capture device includes an image sensor, a frame buffer, and an interpolator module. The image sensor includes a two-dimensional array of pixel elements overlaid with a pattern of f selectively transmissive filters and has a first vertical resolution different from the vertical resolutions specified for a group of video formats. The image sensor outputs digital pixel data representing an image of a scene. The frame buffer, which is in communication with the image sensor, stores the digital pixel data. The interpolator module, which is in communication with the frame buffer, interpolates the digital pixel data to generate video data in at least three color planes and having a second vertical resolution corresponding to a video format selected from the group of video formats.

In one embodiment, the group of video formats includes the NTSC and PAL video formats. The vertical resolution of the image sensor has a value between the vertical resolution of the NTSC and PAL video formats.

In one embodiment, the interpolator module performs interpolation using a set of demosaic filters and a set of scaling filters. In another embodiment, the interpolator module performs interpolation using a set of combined filters, each of the combined filters incorporating a demosaic filter and a scaling filter.

The present invention is better understood upon consideration of the detailed description below and the accompanying drawings.

DETAILED DESCRIPTION OF THE PREFERRED EMBODIMENTS

In accordance with the principles of the present invention, a multi-standard video image capture device uses a single image sensor and applies vertical interpolation to generate video images in multiple video formats. In one embodiment, the video image capture device uses an image sensor having square pixels, that is, each pixel has a 1:1 aspect ratio. The video image capture device captures video images having an intermediate vertical resolution and applies upsampling or downsampling in the vertical direction to generate video signals in the desired video format.

System Overview

Figure 1:
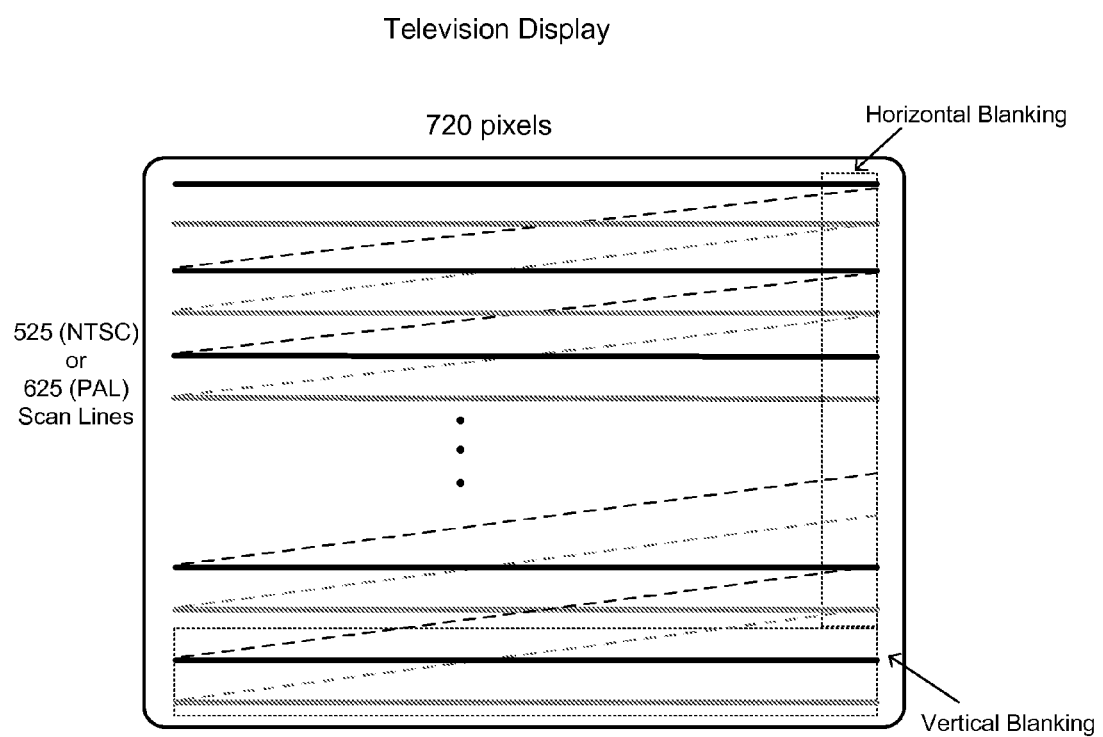
FIG. 1 illustrates the raster scan operation of a television display according to either the NTSC or PAL standard.
Figure 2:
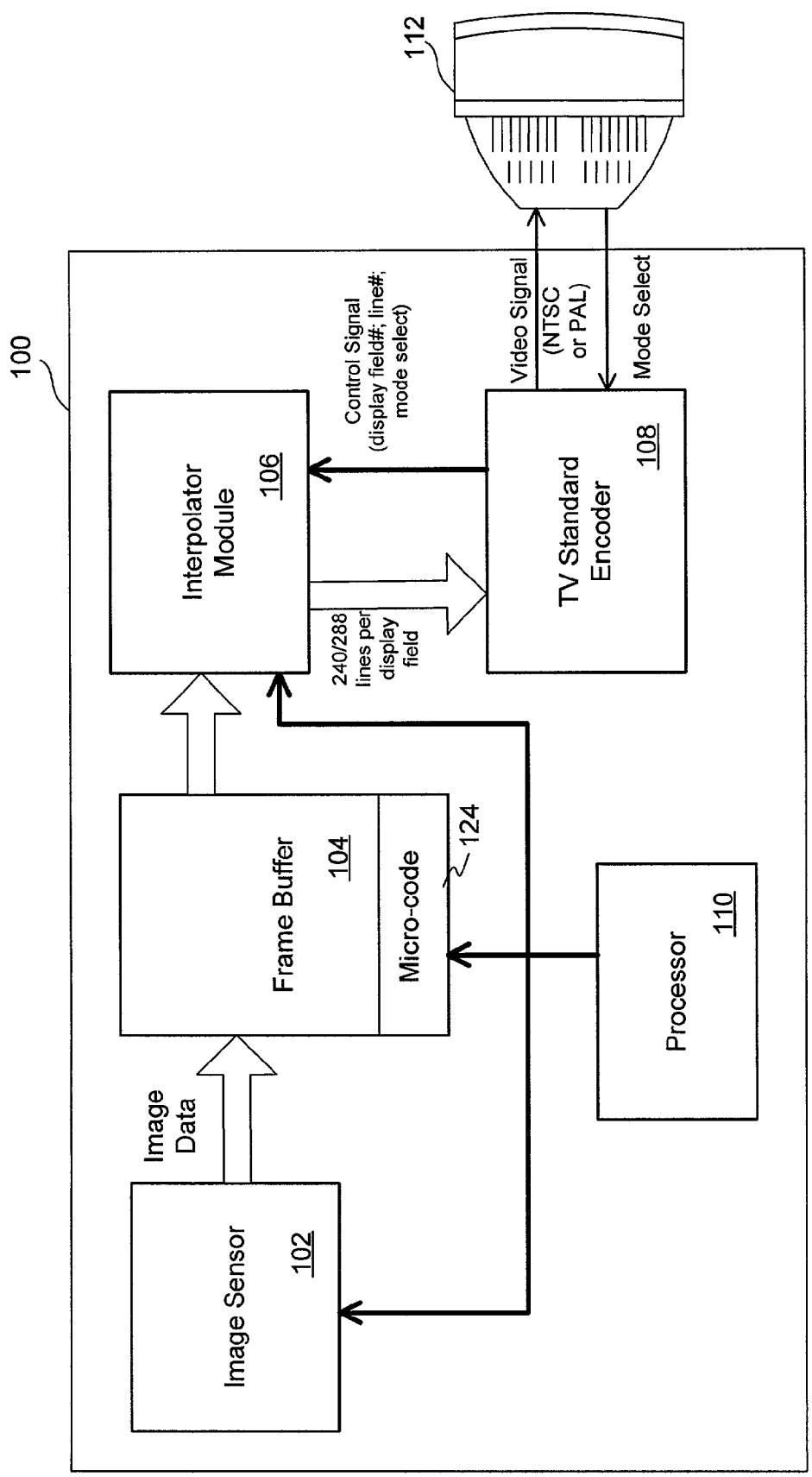
FIG. 2 is a block diagram of the video image capture device according to one embodiment of the present invention.

FIG. 2 is a block diagram of a video image capture device according to one embodiment of the present invention. Referring to FIG. 2, video image capture device 100 collects visual information in the form of light intensity values using an image sensor 102. Image sensor 102 is an area image sensor and includes a two-dimensional array of light detecting elements, also called photodetectors. Image sensor 102 collects image data under the control of a processor 110. At a predefined frame rate, image data collected by image sensor 102 are read out of the photodetectors and stored in a frame buffer 104. Typically, frame buffer 104 includes enough memory space to store at least a portion of a frame of image data from image sensor 102. Frame buffer 104 may also include memory allocation (such as memory space 124) for storing the instructions used by processor 110.

Depending on the video format selected, the image data stored in frame buffer 104 is processed into video data in the desired video format through the operation of an interpolator module 106. The desired video format can be selected in a variety of ways, such as by accepting an input from the user through a mode select signal.

Interpolator module 106 performs vertical interpolation of the image data and either upsamples or downsamples to generate video data having the desired vertical resolution. For color applications, interpolator module 106 also performs color interpolation ("demosaicing") to generate full color video data. In one embodiment of the present invention, interpolator module 106 performs demosaicing and vertical interpolation in separate operations. In another embodiment of the present invention, interpolator module 106 performs both the demosaicing and vertical interpolation operations in one combined operation, thereby reducing the computational burden and time required to process the image data. The full color video data in the selected video format are then provided to a TV encoder 108 to be encoded as video signals (or TV signals) for the selected television standard. TV encoder 108 can encode video data into analog or digital television signals (or video signals).

The encoded video signals can be used in any number of ways depending on the application. For example, the signals can be provided to a television set 112 for display. The encoded TV signals can also be fed to a video recording device to be recorded on a video recording medium. When video image capture device 100 is a video camcorder, the TV signals can be provided to a viewfinder on the camcorder.

In operation, TV encoder 108 drives video image capture device 100 backward by transmitting control signals to interpolator module 106 specifying the line number and the display field (odd or even) for which video signals are to be processed. In response, interpolator module 106 generates full color video data in the selected format for the line number and the display field specified. For example, when the NTSC standard is selected, interpolator module 106 will generate video data having a vertical resolution of 240 lines per field. When the PAL standard is selected, interpolator module 106 will generate video data having a vertical resolution of 288 lines per field.

In the present description, video image capture device 100 generates video signals in either the NTSC video format or the PAL video format. However, this is illustrative only and in other embodiments, video image capture device 100 can be configured to support any video formats and any number of video formats, as long as interpolator module 106 is provided with the appropriate interpolation coefficients, as will be described in more detail below.

The video image capture device of the present invention offers numerous advantages not realized in conventional imaging devices. First, the video image capture device of the present invention provides multi-standard capability, allowing a single imaging device to be used to capture video images to be displayed in any number of television standards. In essence, a user of the video image capture device of the present invention can capture video images and display or record the images in any or all of the television standards. The multi-standard capability of the video image capture device of the present invention provides convenience and ease of use not attainable in conventional video imaging devices. The video image capture device of the present invention uses multiple lines of pixel data to create each scan line of video images. The image capture device is capable of generating video images having adequate image quality, comparable with video images captured using imaging devices with dedicated image sensors for the specific video format (NTSC or PAL).

Second, the video image capture device captures video images having an intermediate vertical resolution and performs either upsampling or downsampling to obtain the desired video format. Thus, the video image capture device of the present invention avoids the use of a costly high resolution image sensor.

Third, by using an image sensor having intermediate resolution, the video image capture device of the present invention also avoids the need for a large memory buffer to store large amount of pixel data resulted from using a high resolution image sensor. In sum, the video image capture device of the present invention provides a cost effective alternative in providing multi-standard capability.

Lastly, by using a single image sensor having a predefined resolution regardless of the ultimate video format, image processing functions, such as temporal filters for noise reduction, can be greatly simplified as such image processing functions are performed on image data having fixed input resolution, prior to the image data being processed into the specific video format.

The detail structure and operation of video image capture device 100 will now be described with reference to the detailed block diagram of the video image capture device in FIG. 5, a color imaging array in FIG. 6, the process flow diagrams in FIGS. 7 and 8, and the flowcharts in FIGS. 9 and 10.

Image Sensor

As described above, video image capture device 100 uses a single image sensor to capture video images which are then processed into video data in any video formats. Image sensor 102 of device 100 is an area image sensor including a two-dimensional array of light detecting elements, also called photodetectors. Image sensor 102 may also include other circuitry to support the operation of the image sensor for collecting image data and reading out the image data from the array. For example, image sensor 102 may include control circuitry, such as address decoders, for accessing the array of photodetectors, readout circuits for reading out the pixel data from the array, analog-to-digital conversion circuit for digitizing the pixel data, and a local memory (optional) for storing the pixel data.

In the present embodiment, image sensor 102 is a digital image sensor and can be implemented as a Complementary Metal-Oxide Semiconductor (CMOS) image sensor, such as an active pixel sensor (APS) or a digital pixel sensor (DPS). Of course, image sensor 102 can be implemented using any image sensor technology, presently available or to be developed. In a preferred embodiment of the present invention, image sensor 102 is implemented as a digital pixel sensor. A CMOS image sensor with pixel level analog-to-digital conversion is described in U.S. Pat. No. 5,461,425 of B. Fowler et al. (the '425 patent), which patent is incorporated herein by reference in its entirety. A digital pixel sensor provides a digital output signal at each pixel element representing the light intensity value detected by that pixel element. The combination of a photodetector and an analog-to-digital (A/D) converter in an area image sensor helps enhance detection accuracy, reduce power consumption, and improves overall system performance.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 3 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 3:
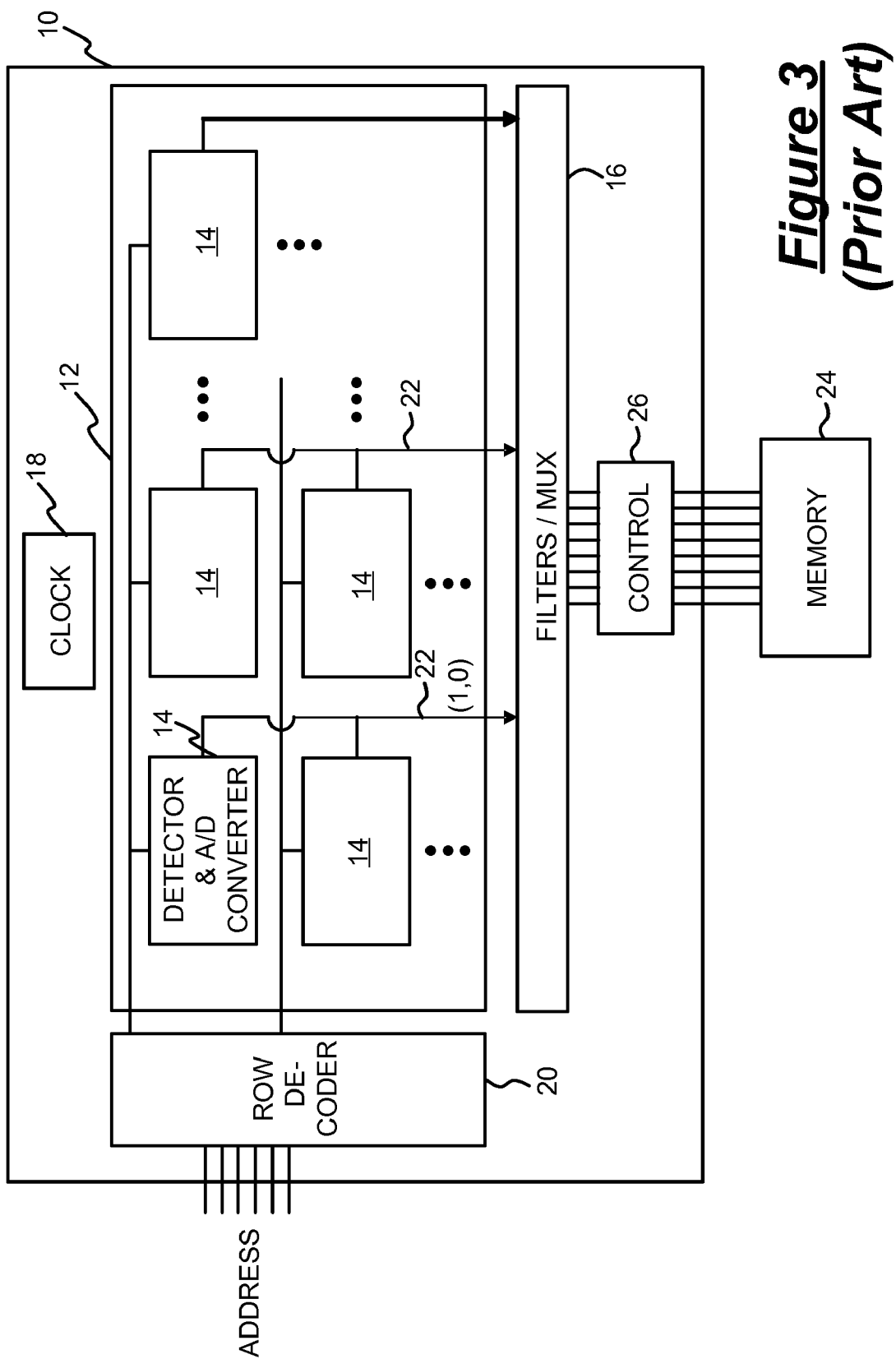
FIG. 3 is a block diagram of a digital image sensor as described in U.S. Pat. No. 5,461,425 of Fowler et al.

In the digital pixel sensor architecture shown in FIG. 3, a dedicated ADC scheme is used. That is, each of pixel element 14 in sensor array 12 includes a ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetectors by multiplexing between the four photodetectors. The shared ADC architecture retains all the benefits of a pixel level analog-to-digital conversion while providing the advantages of using a much smaller circuit area, thus reducing manufacturing cost and improving yield.

In the preferred embodiment of the present invention, the ADC circuit of each digital pixel or each group of digital pixel is implemented using the Multi-Channel Bit Serial (MCBS) analog-to-digital conversion technique described in U.S. Pat. No. 5,801,657 of B. Fowler et al. (the '657 patent), which patent is incorporated herein by reference in its entirety. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout.

Although image sensor 102 of video image capture device 100 can be implemented as any types of digital imaging device, the use of a DPS in image sensor 102 has advantages over other imaging device in that a very large dynamic range in image capture can be achieved. More importantly, the high dynamic range image can be maintained throughout the interpolation process such that the resultant video data can have a high dynamic range, regardless of the video format.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

Figure 4:
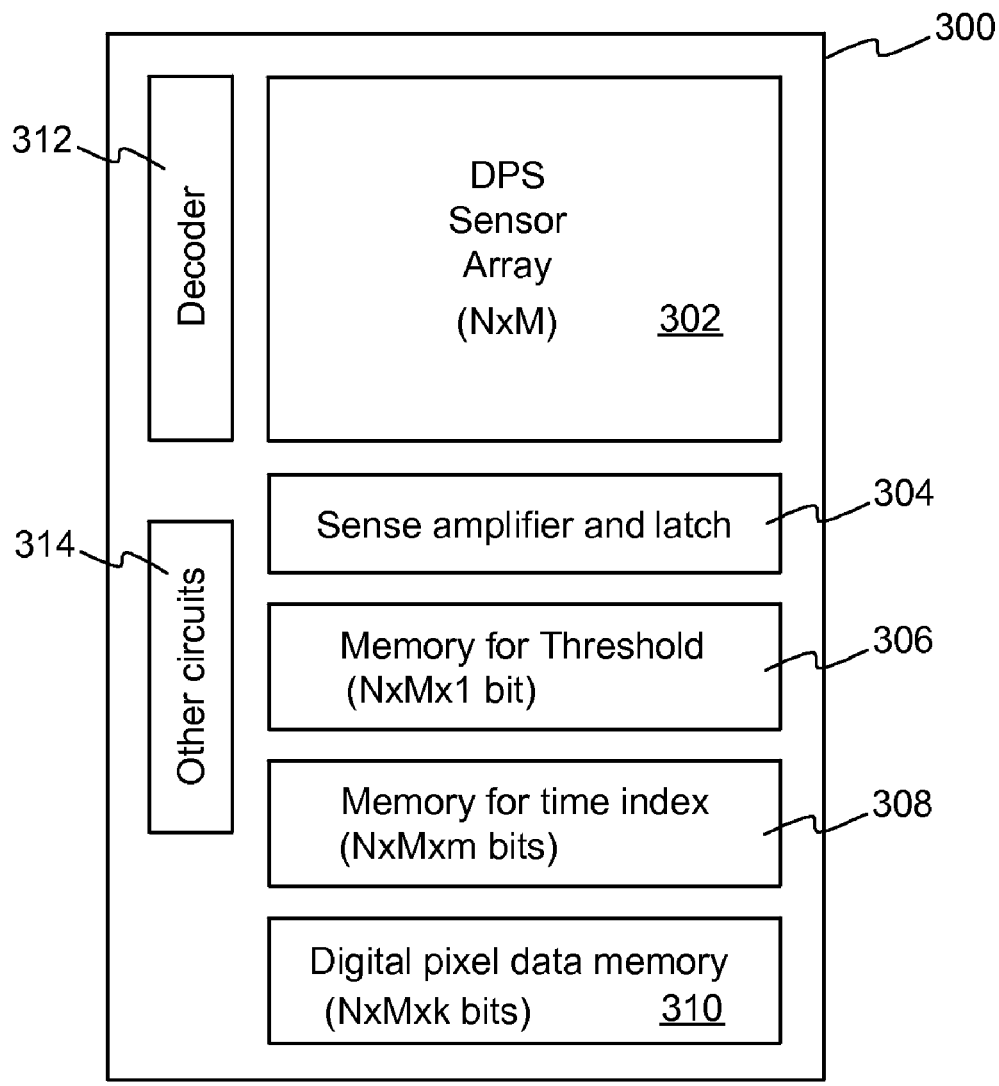
FIG. 4 is a functional block diagram of an image sensor as described in U.S. patent application Ser. No. 09/567,786.

FIG. 4 duplicates FIG. 3 of the '786 patent application and shows a functional block diagram of an image sensor 300 which may be used to practice the method of the present invention. The operation of image sensor 300 using multiple sampling is described in detail in the '786 patent application. Image sensor 300 includes a DPS sensor array 302 which has an N by M array of pixel elements. Sensor array 302 employs either the dedicated ADC scheme or the shared ADC scheme and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. The exposure time indicating when the light intensity measured by each pixel has passed the threshold level is stored in time index memory 308. As a result of this memory configuration, each pixel element in sensor array 302 can be individually time-stamped by threshold memory 306 and time index memory 308 and stored in digital pixel data memory 310. In the present embodiment, image sensor 102 is a DPS image sensor and is implemented in the same manner as image sensor 300 of FIG. 4 to support multiple sampling for attaining a high dynamic range in image capture.

Figure 5:
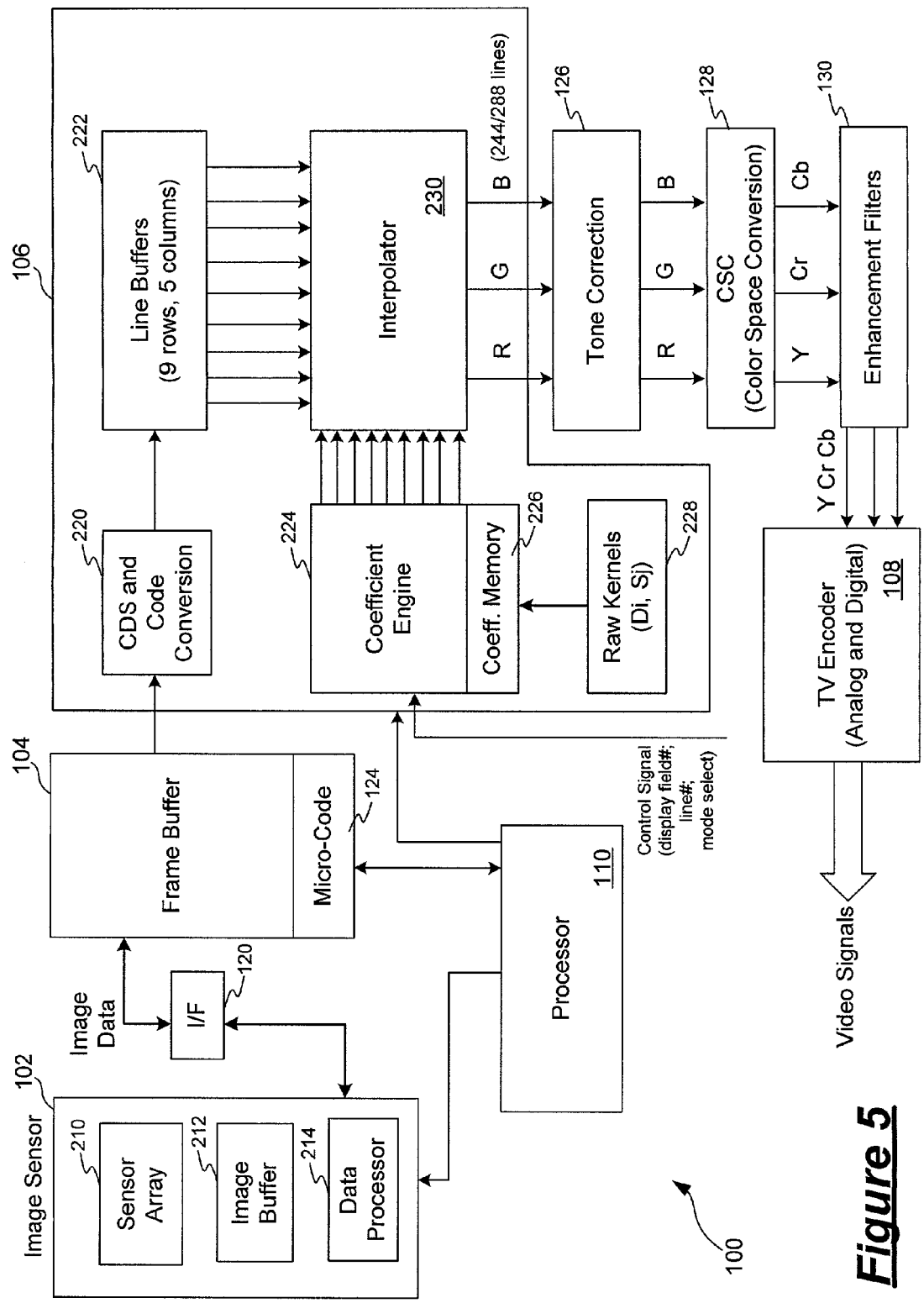
FIG. 5 is a detailed block diagram of a video image capture device according to one embodiment of the present invention.

FIG. 5 is a detailed block diagram of a video image capture device according to one embodiment of the present invention. Like elements in FIG. 2 and FIG. 5 are given like reference numerals to simplify the discussion. Referring to FIG. 5, image sensor 102 includes a sensor array 210 of light detecting elements (also called pixels) and generates digital pixel data as output signals at each pixel location. Image sensor 102 also includes an image buffer 212 for storing at least one frame of digital pixel data from sensor array 210 and a data processor 214 for performing image processing operations, such as normalization of pixel data captured using multiple sampling.

Image sensor 102 may also include other circuits to support the imaging operations. For instance, image sensor 102 may include a readout and control circuit (not shown) for facilitating the readout process of the image data captured by the sensor array. Image sensor 102 may also include row and column decoders, sense amplifiers and other control logic (not shown). The digital pixel data (or image data) captured by sensor array 210 is read by the readout circuit and stored in image buffer 212 which is local (i.e., on the same integrated circuit) to image sensor 102.

Figure 6:
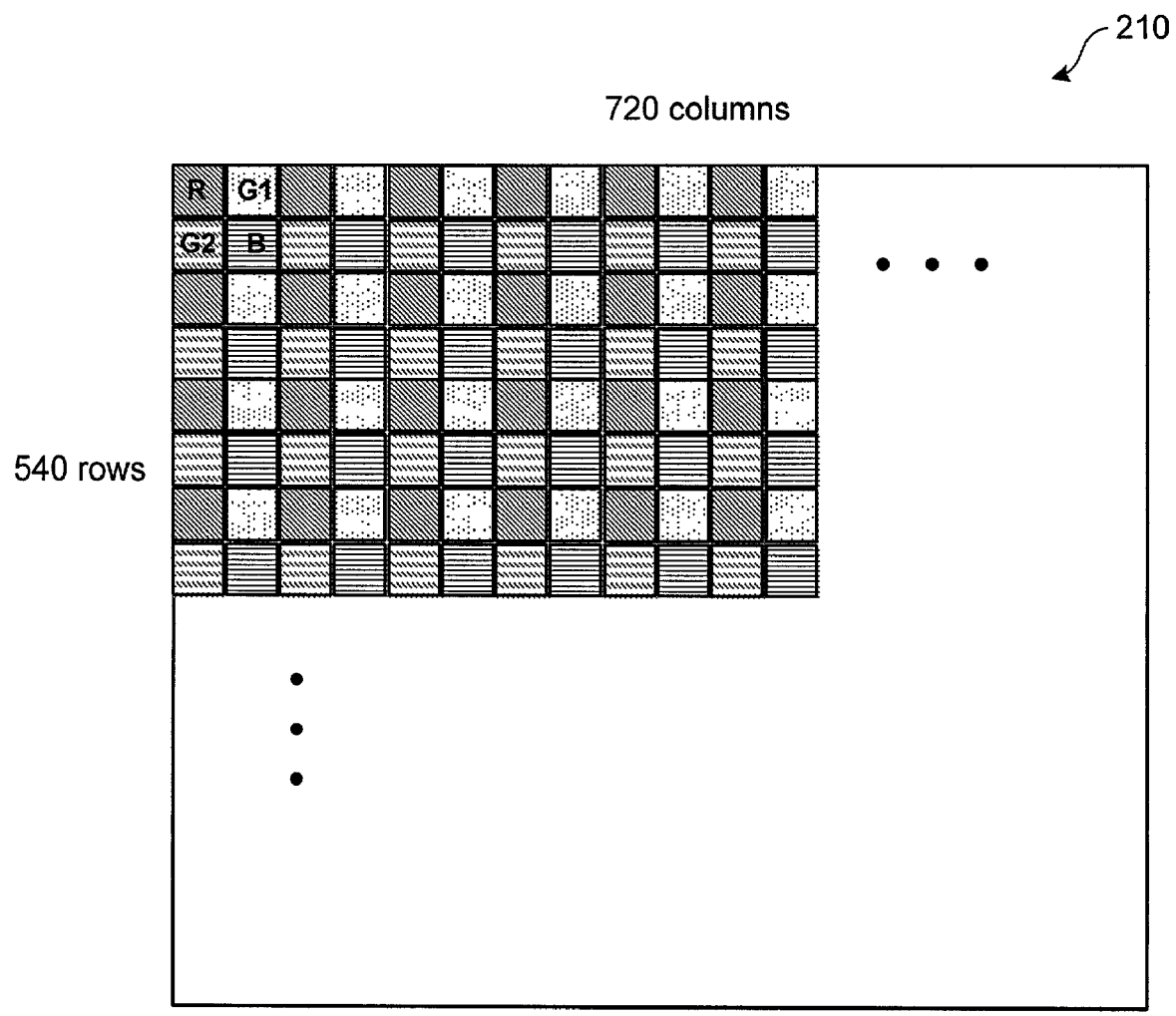
FIG. 6 illustrates a color imaging array which can be used to implement the sensor array in FIG. 5 according to one embodiment of the present invention.

FIG. 6 illustrates a color imaging array which can be used to implement sensor array 210 according to one embodiment of the present invention. Referring to FIG. 6, sensor array 210 includes N rows and M columns of photodetectors. Thus, sensor array 210 has a resolution of N×M pixels. For color applications, sensor array 210 includes a mosaic of selectively transmissive filters superimposed and in registration with each of the photodetectors in the array so that multiple groups of photodetectors are made to sense different color spectrum of the visible light. In the present embodiment, sensor array 210 uses a "Bayer pattern" including individual luminance and chrominance sensing elements. In FIG. 6, sensor array 210 is implemented using a four-color Bayer pattern including green1 (G1) and green2 (G2) luminance sensing elements, and red (R) and blue (B) chrominance sensing elements overlaying a block of 2×2 pixels. The four-color Bayer pattern is repeated throughout sensor array 210 so that each pixel is disposed to sample only one color component of the scene. Pixel values for other color components are missing at each pixel location. To obtain a full color image, an interpolation process is performed amongst the neighboring pixels to determine the interpolated pixel values at each pixel location for the missing color components. The color interpolation process in image sensor 100 will be described in more detail below.

In the present embodiment, in order to support both the NTSC and PAL video format, sensor array 210 is configured to include 720 pixels in the horizontal direction (i.e., 720 columns) and 540 pixels in the vertical direction (i.e., 540 rows). In the present embodiment, each of the pixels in image sensor 102 is a square pixel. That is, the pixels of sensor array 210 each has a 1:1 aspect ratio. As thus configured, sensor array 210 is well suited for television display which uses a 4:3 aspect ratio.

Recall that for the NTSC video format, a full frame video image has 720 active pixels in the horizontal direction and 525 active pixels in the vertical direction. On the other hand, for the PAL video format, a full frame video image has 720 active pixels in the horizontal direction and 625 active pixels in the vertical direction. Thus, in the present embodiment, sensor array 210 is configured to have the same horizontal resolution as the NTSC and PAL video formats but an intermediate vertical resolution as compared to the NTSC and PAL video formats. In this manner, image data captured by sensor array 210 can be converted to either the NTSC standard or the PAL standard by interpolating (or scaling) pixel data along the vertical direction only. Specifically, pixel data captured by sensor array 210, having a vertical resolution of 540 pixels, is downsampled to obtain image data in the NTSC video format (240 lines per display field) (or the PAL video format (288 lines per display field). Because no horizontal interpolation is needed, the image quality of the final video images can be greatly improved. The operation of interpolator module 106 in upsampling or downsampling image data from image sensor 102 will be described in more detail below.

The 720×540 resolution of the image sensing array (array 210) selected for the present embodiment is illustrative only. In other embodiments, the image sensing array can have other resolution suitable for the television standards to be supported. Also, the resolution of the image sensing array can be selected to maintain compatibility with existing, cost effective optical systems. For example, in the present embodiment, the 720×540 resolution in combination with the specific pixel size of sensor array 210 results in an image sensor with a 6 mm diagonal dimension which is compatible with existing optical systems.

Image Data Processing Method Overview

As described above, the image data captured by image sensor 102 is processed by interpolator module 106 into video data having the selected video format. The image data processing operation includes two main components. The first component is a color interpolation process to reconstruct missing pixel values at each pixel location using pixel data captured using a color filter pattern. The second component is a vertical interpolation process where the image data, having a vertical resolution defined by the image sensing device (such as 540 lines per frame), are resampled into video data having the vertical resolution specified by the selected television standard (such as 240 or 288 lines per even/odd display field). FIGS. 7 and 8 are process flow diagrams illustrating the image data processing operation according to two embodiments of the present invention.

Image data captured by image sensor 210 can be represented as a two-dimensional array of pixel data, each pixel data associated with one color component of the four-color Bayer pattern. However, full color video data are represented by three sets of pixel values, one set of pixel value for each of the three primary color planes (such as red, green and blue) at every pixel location. Color interpolation is a process for deriving the pixel values for the missing color components at each pixel location using a neighborhood of pixels. Techniques for performing color interpolation ("demosaicing") are known in the art. U.S. Pat. Nos. 4,642, 678 to Cok, 5,373,322 to Laroche et al., and 5,475,769 to Wober et al. describe various methods for recovering missing pixel values from sampled color image data. The color interpolation process in the image data processing method of the present invention can apply any of the techniques described in the above referenced patents which patents are incorporated herein by reference in their entireties.

In the present embodiment of the present invention, the color interpolation process in the image data processing method uses an n×n convolution kernel to compute missing pixel values for each pixel location based on the pixel values of a neighborhood of pixels surrounding each pixel location. For an n×n neighborhood of pixels, the convolution kernel is an n×n set of coefficients. In the interpolation process, a different kernel of coefficients is used for each color plane of the final full color image and for each color filter type in the filter pattern. The use of convolution kernels in color interpolation is described in the aforementioned Wober patent and also in copending and commonly assigned U.S. patent application Ser. No. 10/006,974, entitled "Method of Defining Coefficients For Use In Interpolating Pixel Values," of Benjamin P. Olding and Ricardo J. Motta, filed Dec. 5, 2001. The '974 patent application is incorporated herein by reference in its entirety. In brief, full color pixel data are reconstructed by applying the appropriate convolution kernel to each pixel location of the sensor array and computing the full color pixel values for each pixel location.

The color interpolation process requires a set of coefficients to be determined for each color plane in the full color image and for each color filter of the filter pattern used by the image sensor. Thus, when the final full color image has three color planes (e.g., RGB) and the filter pattern applied to the image sensor has four types of color filters (e.g., R, G1, G2 and B), a total of 12 n×n convolution kernels are needed to interpolate the pixel data. In the present embodiment, the color kernel used for color interpolation is a square matrix (n×n). However, the use of a square convolution kernel in the present description is illustrative only. In other embodiments, an n×n' convolution kernel, where n≠n', can be used.

In one embodiment of the present invention, the method for defining coefficients described in the aforementioned Wober patent is used. Wober describes a method for determining a set of weighting coefficients using a linear, minimum mean square error solution of a matrix and vector expression. The matrix and vector expression defines the relationship between a neighborhood of pixel values and the actual values of the same neighborhood of pixels for a particular color component. In a preferred embodiment of the present invention, the method for defining coefficients described in the aforementioned '974 patent application is applied. In the '974 patent application, the coefficients for the convolution kernels are computed by applying a constraint matrix specifying one or more constraints. The constraints are selected to enhance the image quality of the resultant full color image, such as color uniformity and edge uniformity in the final image.

As described above, video image capture device 100 includes sensor array 210 having a horizontal resolution that commensurate with the television standards (e.g. NTSC and PAL) that device 100 is to support. Thus, device 100 performs only vertical interpolation to resample the image data into the resolution of the desired video format. Techniques for performing vertical interpolation of pixel data are known. For example, U.S. Pat. No. 5,764,238, to Lum et al., and U.S. Pat. No. 6,347,154, to Karanovic et al., describe methods for scaling image data to be displayed in either the horizontal or the vertical direction. The aforementioned patents are incorporated herein by reference in their entireties.

Figure 7:
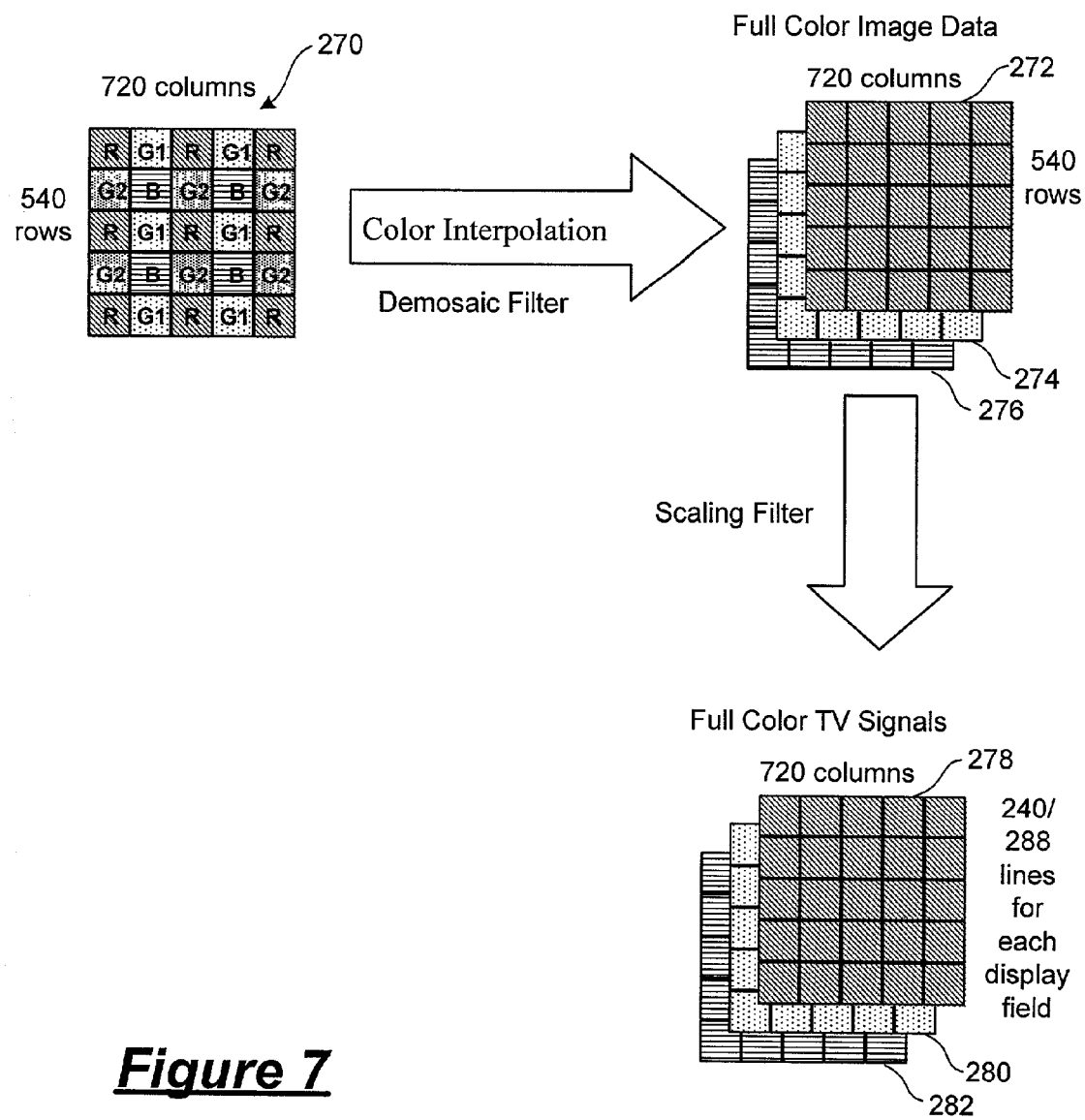
FIG. 7 is a flow diagram illustrating the image data processing method according to one embodiment of the present invention.

FIG. 7 is a flow diagram illustrating the image data processing method according to one embodiment of the present invention. Referring to FIG. 7, a pixel array 270 represents a portion of sensor array 210 overlaid with a Bayer filter pattern including four types of color filters. Pixel data at each pixel location represents the intensity of the specific color component of the light impinging upon that pixel location. In the present embodiment, the image data processing method first applies color interpolation to reconstruct the missing color components so that image data representing a full color image is obtained. In the present embodiment, full color video data in device 100 is represented in the RGB color space. The color interpolation process applies a set of convolution kernels ("demosaic filters") to the image data to generate image data in each of the RGB color planes, depicted as red color plane 272, green color plane 274 and blue color plane 276 in FIG. 7. Note that the use of the RGB color space in the present embodiment is illustrative only. In other embodiments, the color interpolation process can be applied to generate image data in any desired color space by using the corresponding convolution kernels.

Then, the image data processing method applies vertical interpolation of the full color image data and provide video data having the desired vertical resolution. For example, if the target video format is NTSC, vertical interpolation is applied to generate video data having a vertical resolution of 240 lines per field. The vertical interpolation operation applies a set of scaling filters (or scaling kernels) to the full color image data where the scaling filters are functions of the horizontal position of the scan line being processed.

Figure 8:
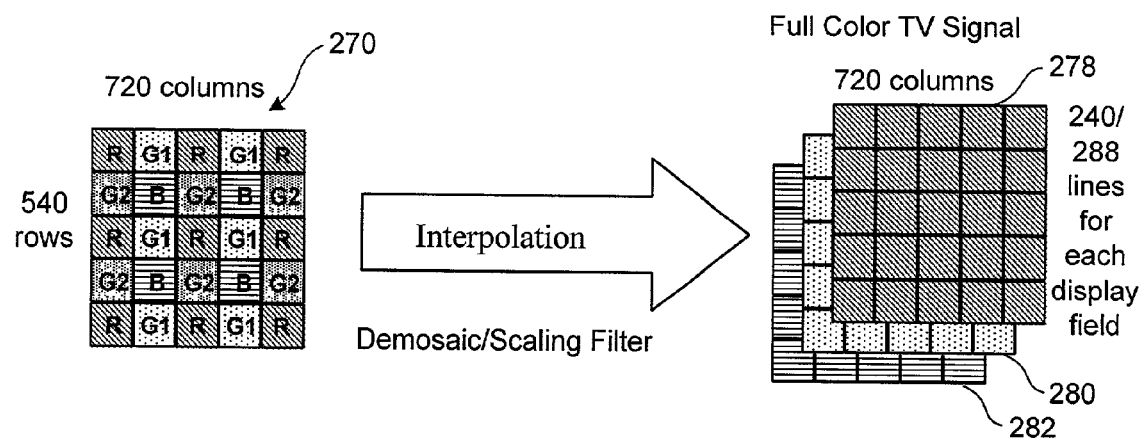
FIG. 8 is a flow diagram illustrating the image data processing method according to an alternate embodiment of the present invention.
Figure 9:
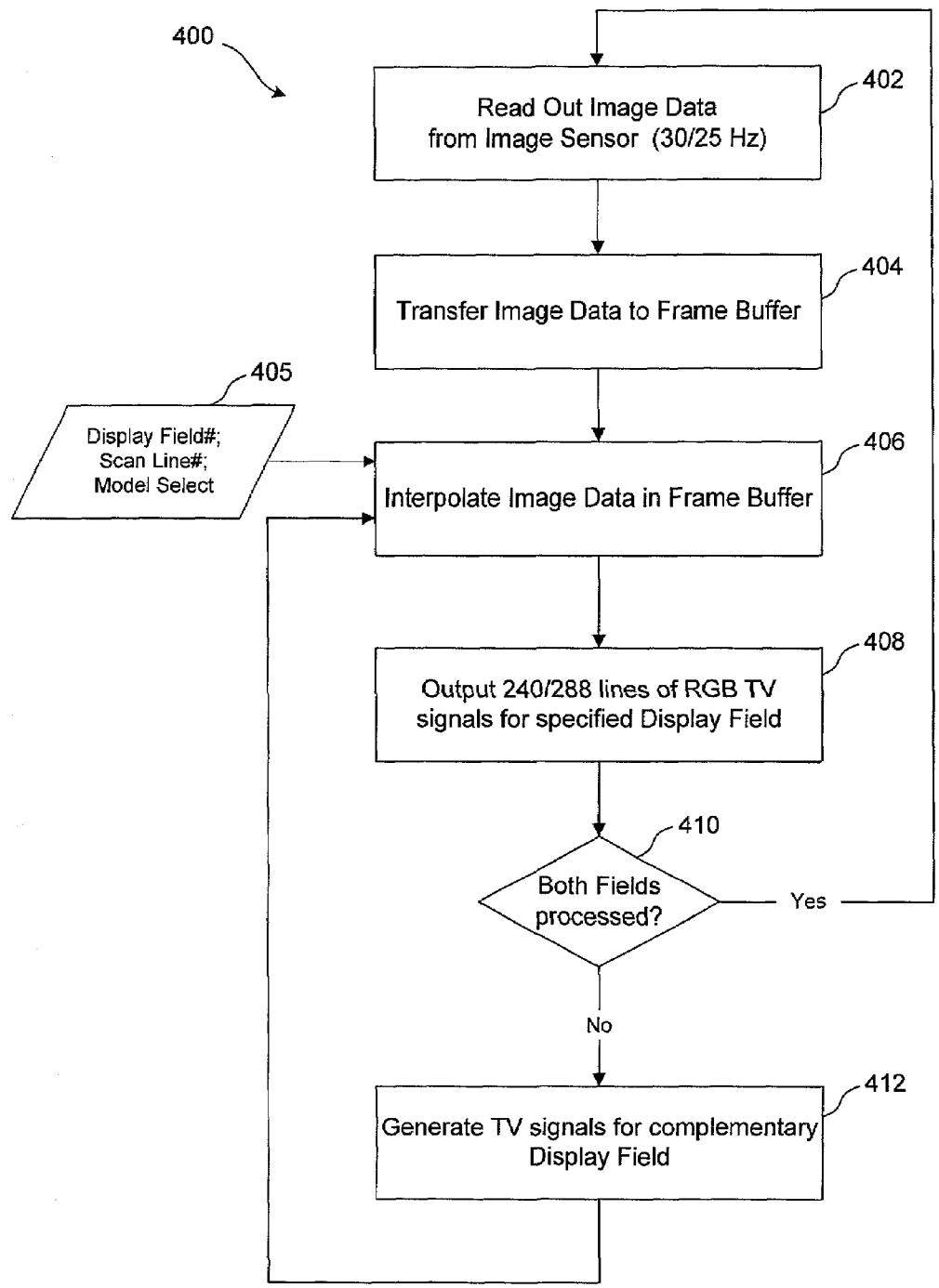
FIG. 9 is a flowchart illustrating the image data processing method according to one embodiment of the present invention.

FIG. 8 is a flow diagram illustrating the image data processing method according to an alternate embodiment of the present invention. In the image data processing method shown in FIG. 8, the color interpolation operation and the vertical interpolation operation are combined by using a combined demosaic/scaling filter. Thus, image data captured by sensor array 210 (depicted by pixel array 270 in FIG. 8) are processed into full color video data in the three color planes (278, 280 and 282) directly.

FIGS. 7 and 8 are provided to illustrate the two main components of the image data processing operation of the present invention. Of course, the image processing operation may include other signal processing functions, such as image enhancement operations, to enhance the quality of the video image. In one embodiment of the present invention, the image enhancement operation performs sharpening/softening of the image data by applying a frequency response correction filter to the image data. For example, the frequency response correction filter can be a high-pass filter to boost the high frequency response of the image data. In one embodiment, the image enhancement operation can be carried out separately from the color interpolation and vertical interpolation operations. In another embodiment, the image enhancement operation can be combined with the color and vertical interpolation operations by integrating the demosaic, scaling and frequency response correction filters into one combined filter.

Although the image data processing method can be operated by performing the color interpolation, vertical interpolation and image enhancement operations separately, certain advantages can be realized by combining the operations and applying one filter to process the image data in one interpolation operation. Specifically, when the image processing operations are combined, there is no need to store intermediate results generated by each individual interpolation operation. Thus, the use of a combined filter conserves memory space required for the operation of video image capture device 100, thereby conserving silicon resource when device 100 is manufactured as an integrated circuit. Additionally, applying a combined filter incorporating the color filter, the scaling filter and the image enhancement filter (if any) eases the computational burden by simplifying the image data processing operations and reduce the power consumption level of the video image capture device.

Image Data Processing Method

The detailed image data processing operation of video image capture device 100 of the present invention will now be described with reference to the detailed block diagram of FIG. 5 and the flowchart of FIG. 9. FIG. 9 is a flowchart illustrating the image data processing method according to one embodiment of the present invention.

At step 402 (FIG. 9), image sensor 102, operating under the control of processor 110, captures image data by exposing sensor array 210 to the desired scene or scenes of motion. Sensor array 210 is operated to sample the desired scene at a rate determined by the television standard selected. Thus, for NTSC standard, the image data is read out at a frame rate of 30 Hz. For the PAL standard, the image data is read out at a frame rate of 25 Hz At each sampling, a full frame of image data, having a resolution of 720×540 pixels, is read out and stored in image buffer 212. The image data may be processed by data processor 214 (FIG. 5), such as to normalize image data captured using multiple sampling and to organize the pixel data read out of the sensor array in the desired order.

At step 404 (FIG. 9), processor 110 directs the transfer of image data from image buffer 212 to frame buffer 104, such as through an interface circuit 120. Because large amount of image data is transferred from image buffer 212 to frame buffer 104, interface circuit 120 is a high speed link. In one embodiment, interface circuit 120 uses low voltage differential signaling to facilitate the data transfer and can be operated at up to 400 MHz.

Then, at step 406, interpolator module 106 reads the image data stored in frame buffer 104 and interpolates the image data to generate full color video data (RGB) for the selected video format. Besides receiving the image data from frame buffer 104, interpolator module 106 also receives control signals from TV encoder 108. Specifically, TV encoder 108 transmits control signals instructing interpolator module 106 which line number in which display field (odd or even) to process image data. TV encoder 108 also transmits the mode select signal to interpolator module 106 instructing the module to generate video data in the desired video format.

Image data from frame buffer 104 may be preprocessed before interpolation is performed. Referring to FIG. 5, in the present embodiment, image data from frame buffer 104 is first processed by a CDS and code conversion circuit 220. CDS or "Correlated Double Sampling" is a technique applied in image sensors for eliminating non-uniformity in the sensor array. CDS can be used to correct for the variable comparator offset between the photodetectors in the array. When CDS is implemented, the sensor array is reset at the start of each capture. Then, the voltage present at each of the photodetectors (also called the "CDS reset value" or "reset value") is measured and stored in a designated memory location of the image sensor, such as image buffer 212. Subsequently, for each frame of pixel data captured by the sensor array, the stored reset values are subtracted from the corresponding pixel intensity value to derive the pixel data. In the present embodiment, circuit 220 is included to perform preprocessing of the image data by subtracting the CDS reset values from the image data and converting the image data represented in Gray code to binary representation.

In operation, interpolator module 106 loads portions of image data to be processed from frame buffer 104 into a line buffer 222. In the present embodiment, line buffer 222 stores 9 rows of image data, that is image data for 6480 pixels are stored in line buffer 222. The size of line buffer 222 is dictated by the size of the convolution kernels used for color interpolation and the size of the scaling filters used for the vertical interpolation process. The 5 by 9 configuration chosen in the present embodiment relates to the size of the combined convolution kernel used to interpolate the image data, as will be described in more detail below. In other embodiments, line buffer 222 may have other configurations.

A 2-D interpolator 230 in interpolator module 106 reads the image data stored in line buffer 222 and performs the interpolation operations. As described above, interpolation of the image data can be performed in one of two ways. In the first embodiment, the color interpolation and vertical interpolation operations are performed separately, as illustrated in FIG. 7. Interpolator 230 first performs color interpolation by applying the appropriate demosaic filter to the image data stored in line buffer 222. The coefficients for the demosaic filter are provided to interpolator 230 by a coefficient engine 224. Then, interpolator 230 performs vertical interpolation of the full color image data by applying the appropriate scaling filter to the full color image data. The scaling filter operates to scale the 720×540 resolution image data to the selected video format. For example, when the NTSC video format is selected, the scaling filter is applied to scale down the image data to a resolution of 720×240 pixels per field. The coefficients of the scaling filter are also provided by coefficients engine 224. Interpolator 230 can also apply image enhancement operations, such as sharpening/softening, to the image data after the vertical interpolation process. In this embodiment, the coefficients for the demosaic filters and the scaling filters can be stored in a coefficient memory 226 in coefficient engine 224. Coefficient engine 224 retrieves the desired filters by indexing memory locations in coefficient memory 226.

In the second embodiment of the present invention, the color interpolation and vertical interpolation operations are combined and performed in one step, as illustrated in FIG. 8. In the present embodiment, the color interpolation and vertical interpolation operations are combined by combining the demosaic filter with the corresponding scaling filter so that a combined filter can be applied to the image data to generate video data in full color and having the desired video format directly.

The color interpolation process applies a demosaic filter which is an n×n convolution kernel. In the present embodiment, a 5×5 convolution kernel is used. To perform color interpolation, a total of 12 convolution kernels are used in the present embodiment, one for each color space (RGB) and for each filter type of the filter pattern (R, G1, G2 and B).

The vertical interpolation process applies a scaling filter which in the present embodiment, is a 1×5 scaling filter. In the present embodiment, a 5-tap filter is used to improve the high frequency response of the filter operation. In other embodiments, an m-tap filter can be used to obtain the desired resolution. Increasing m (the number of taps) of the scaling filter improves the resolution of the final image. In theory, a different scaling filter is needed for each scan line of the video image because the vertical interpolation is not always performed along pixel boundaries. For example, in the present embodiment, sensor array 210 has 540 lines of pixels and thus each pixel is 1/540 in unit height. However, an NTSC display, for example, has 480 active lines and thus each line has an unit height of 1/480. Therefore, vertical interpolation of each line in the NTSC display makes use of a different set of pixel data from the image sensor. As a result, to attain infinite precision and a perfect image, a large number of filters may be required. For NTSC format, 72 different kernels are required. For PAL format, 240 kernels are required.

However, in practice, only a limited number of scaling filters is needed because each scan line in a television display has limited precision. The limited precision of each scan line in a display is a result of several factors. First, the frequency response of the transmission channel limits the spatial resolution in horizontal direction. Since the spatial resolution in the horizontal direction is limited already, there is no need to be infinitely precise in vertical direction. Second, jitters in the deflection circuit of the display cause uncertainty in vertical position of the scanning e-beam. Finally, the human visual perception capability will not be sufficient to notice a limited accuracy in the vertical or horizontal positioning of interpolated pixel. The limited precision of each scan line can be exploited to reduce the number of scaling filters needed to obtain satisfactory image results. In the present embodiment, only thirty two scaling filters, S0 to S31, are used for all of the scan lines in each of the video format.

In accordance with the present invention, the combined demosaic and scaling filter ("DS filter") is given as follows:

$$[D] \times [S] [DS],\qquad \text{Eq. (1)}$$

where matrix D is the 5×5 demosaic filter, matrix S is the 1×5 scaling filter and matrix DS is the combined demosaic and scaling filter. In the present embodiment, the DS matrix is a 5×9 matrix generated by applying the scaling filter to each vertical position of the demosaic filter. In the present embodiment, 12 demosaic filters and 32 scaling filters are used to support the interpolation operations in interpolator 230. Thus, a total of 12×32 or 384 5×9 DS filters are needed to interpolate pixel data for all of the pixels in sensor array 210.

In one embodiment of the present invention, the 384 DS filters can be precomputed and stored in coefficient memory 226 of coefficient engine 224. Interpolator 230 retrieves the DS filter it needs for the processing of image data for each scan line of the displayed image. However, the storage of the large number of pre-computed DS filters requires a large amount of memory and may not be desirable when device 100 is manufactured in an integrated circuit where silicon real estate is critical. Furthermore, the memory access time required to retrieve each DS filter from a large memory may not be fast enough to support real-time video display. Cache memory or other fast memory needs to be used to store the kernels so that the kernels can be accessed for real-time display purposes.

Thus, in another embodiment of the present invention, the DS filters are not precomputed and stored. Instead, only the 12 5×5 demosaic filters (D filters) and the 32 1×5 scaling filters (S filters) are stored and the DS filters that are required for each scan line of the display image are generated on-the-fly. Thus, in this embodiment, only 12+32 or 44 "raw" kernels (filters), instead of 384 filters, are stored in device 100, thereby significantly reducing the size of the memory required and consequently reducing the memory access time required to address the raw filters. Referring to FIG. 5, the raw filters (Di and Sj) are stored in an allocated memory location 228 in device 100. Coefficient engine 224 operates to generate the DS filters necessary for each scan line based on the control signals received from TV encoder 108, which control signals specifying the field number (odd/even) and the scan line number for which video data are to be generated.

In the present embodiment, the DS filters are generated during the horizontal blanking time of the video display. Coefficient engine 224 index raw kernel memory 228 to retrieve the raw filters. Coefficient engine 224 computes the DS filters based on the raw filters and store the DS filters in coefficient memory 226 to be used for the processing of video data in the current scan line. For each scan line in the display image of the video display, 6 DS filters are computed. 6 DS filters are required because there can be at most two color filter types on each line of the sensor array (see FIG. 6), thus 6 demosaic filters are needed for each scan line. As a result, 3×2 or 6 DS filters are computed for each line of image data.

The 12 DS filters are used to interpolate image data in each row of the sensor array. That is, each set of 12 DS filters is used to interpolate image data associated with 720 pixels on each row. As each row of image data is processed, image data in line buffer 222 is shifted and new image data from frame buffer 104 is loaded into line buffer 222 so that at any time 9 rows of image data are stored in the line buffer. Interpolator 230 interpolates image data from 45 (9×5) pixels, centered around the current pixel position and stored in line buffer 222 to generate video data in the three color planes (RGB). The 5 columns of image data are processed to generate video data in the three color components. When interpolator 230 completes the interpolation of image data for one scan line of video data, interpolator 230 proceeds to the next scan line of image data. In the present embodiment, the 6 DS filters required for the next row of image data are generated during the horizontal blanking time. In other embodiments, the next set of DS filters can be generated concurrently with the processing of pixel data for the current line as long as sufficient memory is provided to store the next set of DS filters.

Returning to FIG. 9, interpolator module 106 processes the image data and outputs video data for one field (odd or even) in the selected video format (i.e., 240 lines for NTSC standard or 288 lines for the PAL standard) (step 408 in FIG. 9). In the present embodiment, the video data are provided to a tone correction module 126 (FIG. 5), a CSC (Color Space Conversion) module 128 (FIG. 5) and an enhancement filter module 130 (FIG. 5) before being encoded into video signals into the selected format (NTSC or PAL). In one embodiment, enhancement filter module 130 includes a frequency response correction filter to perform image sharpening and softening. In another embodiment, enhancement filter module 130 can also include a set of median filters for noise reduction.

Television images are displayed in odd and even field interlaced format. Thus, interpolator module 106 processes image data to generate video data for one display field at a time. In the present embodiment, image data processing method generates video data in the odd and even field using the same set of image data. Thus, at step 410, method 400 determines if both display fields have been processed. If not, method 400 returns to step 406 and interpolates the same frame of image data stored in frame buffer 104 to generate video data for the next display field.

Figure 10:
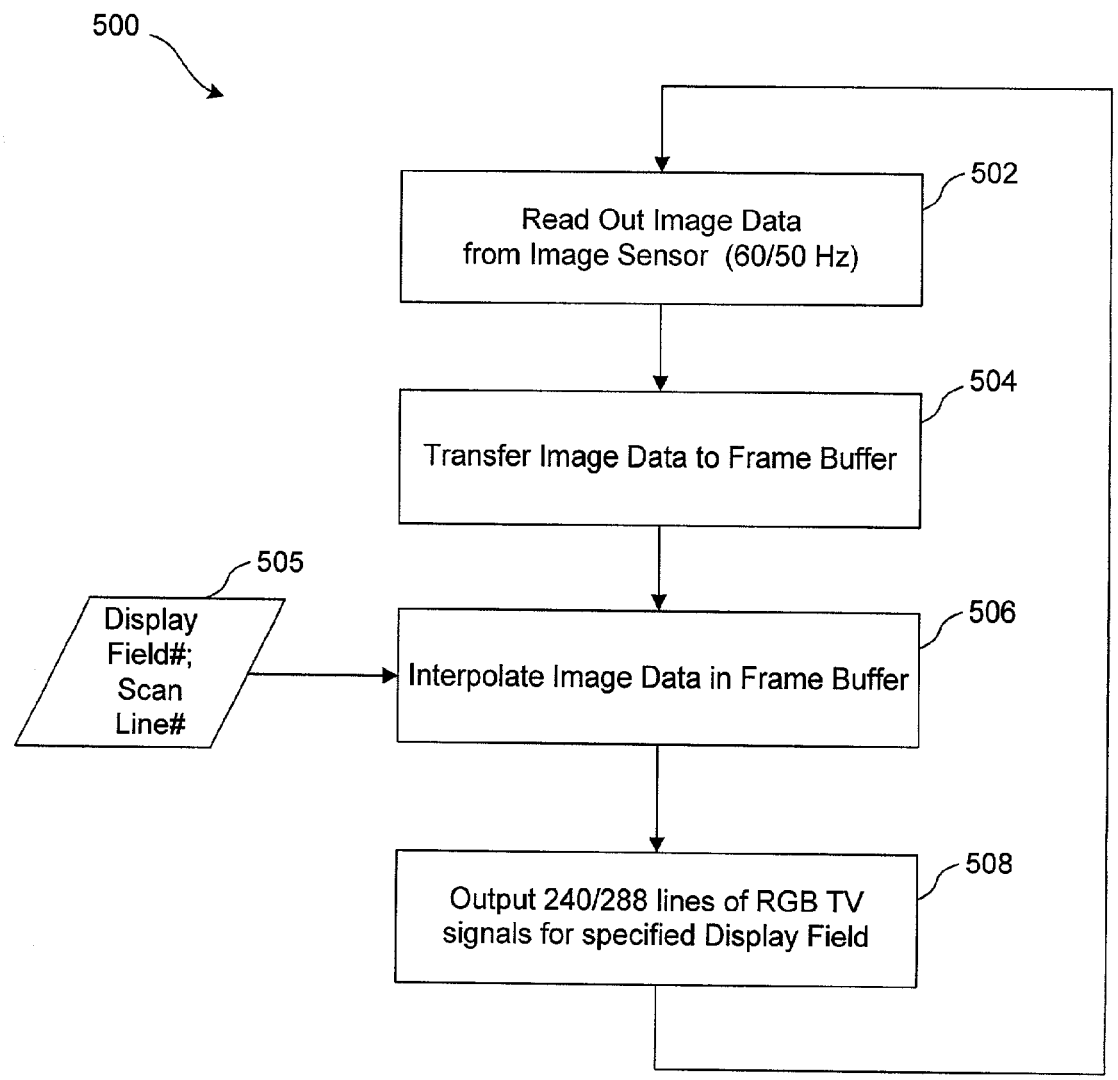
FIG. 10 is a flow chart illustrating the image data processing method according to an alternate embodiment of the present invention.

FIG. 10 is a flow chart illustrating the image data processing method according to an alternate embodiment of the present invention. FIG. 10 provides an alternate means to generate video signals for the odd and even display fields. Referring to FIG. 10, image data processing method 500 operates by sampling image sensor 102 for new image data for each display field. Thus, at step 502, image data samples the desired scene and image data is read out at a rate determined by the television standard selected. Thus, for NTSC standard, the image data is read out at a field rate of 60 Hz. For the PAL standard, the image data is read out at a field rate of 50 Hz. Each frame of image data is stored in frame buffer 104 (step 504). Then, interpolator module 106 performs interpolation of the image data as described above with reference to FIG. 9 (step 506). Interpolator module 106 generate video data for one display field in the selected video format (step 508). Then, method 500 returns to step 502 to read out another frame of image data from which the video data for the next display field will be derived. Interpolator module 106 determines which display field to generate video data for based on the display field number signal received from TV Encoder 108.

The above detailed descriptions are provided to illustrate specific embodiments of the present invention and are not intended to be limiting. Numerous modifications and variations within the scope of the present invention are possible. For example, the resolution of the imaging array can be configured for the desired video formats. Accordingly, when HDTV, having an aspect ratio of 16:9, is applied, the imaging array can have the corresponding number of pixels in the vertical and horizontal direction. Furthermore, the video image capture device of the present invention can be implemented as an integrated circuit or a set of integrated circuits. In one embodiment, image sensor 102 is manufactured in one integrated circuit and the remaining components of video image capture device 100 are manufactured in a second integrated circuit. The present invention is defined by the appended claims.

We claim:

1. A video image capture device, comprising:
    an image sensor comprising a two-dimensional array of pixel elements overlaid with a pattern of a given number of selectively transmissive filters and having a first vertical resolution being an intermediate vertical resolution of vertical resolutions specified for a group of video formats, said image sensor outputting digital pixel data representing an image of a scene;
    a frame buffer, in communication with said image sensor, for storing said digital pixel data; and
    an interpolator module, in communication with said frame buffer, for interpolating said digital pixel data by upsampling or downsampling in the vertical direction only to generate video data in at least three color planes and having a second vertical resolution corresponding to a video format selected from said group of video formats;
    wherein said interpolator module applies at least one combined filter for interpolating said digital pixel data into video data in a first color plane and having said second vertical resolution, said combined filter incorporating a demosaic filter and a scaling filter, and wherein said demosaic filter is an n×n' convolution kernel where n=n' or n≠n', said scaling filter is a 1×m convolution kernel, and said combined filter is an n×(n'+m−1) convolution kernel.

2. The device of claim 1, wherein said group of video formats comprises NTSC and PAL video formats.

3. The device of claim 2, wherein said first vertical resolution is 540 pixels.

4. The device of claim 1, wherein said interpolator module receives a mode select signal selecting said video format having said second vertical resolution from said group of video formats.

5. The device of claim 1, further comprising:
    a processor, in communication with said image sensor, said frame buffer and said interpolator module, for directing said image sensor to output pixel data, storing said pixel data in said frame buffer and operating said interpolator module to process said pixel data.

6. The device of claim 1, further comprising:
    a TV encoder, in communication with said interpolator module, for encoding said video data in said selected video format and for providing control signals to said interpolator module, said control signals identifying a display field and a scan line for which video data are to be processed.

7. The device of claim 1, wherein each of said pixel elements of said image sensor generates analog signals representative of said image, and said image sensor further comprises an analog-to-digital converter for converting said analog signals to said digital pixel data.

8. The device of claim 1, wherein said image sensor comprises a two-dimensional array of digital pixels, each of said digital pixels outputting digital signals as said digital pixel data representative of said image.

9. The device of claim 1, wherein said image sensor further comprises a data memory, in communication with said array of pixel elements, for storing said digital pixel data generated by said array prior to transfer to said frame buffer.

10. The device of claim 1, wherein said interpolator module applies at least one demosaic filter for interpolating said digital pixel data into video data in a first color plane and applies at least one scaling filter for interpolating said video data in said first color plane into video data having said second vertical resolution.

11. The device of claim 1, wherein said interpolation module further comprises a coefficient memory for storing a set of precomputed combined filters.

12. The device of claim 1, wherein said interpolation module further comprises a coefficient engine and a raw kernel memory storing a set of demosaic filters and a set of scaling filters, said coefficient engine computing said at least one combined filter momentarily prior to interpolating said digital pixel data.

13. The device of claim 12, said video data is coupled to a display device for display and said coefficient engine computes said at least one combined filter during a horizontal blanking time of said display device.

14. The device of claim 10, wherein said interpolation module further applies an image enhancement filter to said video data, said image enhancement filter comprising a frequency response correction filter.

15. The device of claim 14, wherein said image enhancement filter comprises a set of median filters for noise reduction.

16. The device of claim 1, wherein said combined filter further incorporates an image enhancement filter, said image enhancement filter comprising a frequency response correction filter.

17. The device of claim 16, wherein said image enhancement filter comprises a set of median filters for noise reduction.

18. The device of claim 1, wherein said interpolator module comprises:
a plurality of line buffers for storing a portion of said digital pixel data to be interpolated;
a raw kernel memory for storing a set of demosaic filters and a set of scaling filters;
a coefficient engine for computing a plurality of combined filters using said set of demosaic filters and said set of scaling filters, said plurality of combined filters being stored in a memory in said coefficient engine; and
an interpolator, in communication with said plurality of line buffers and said coefficient engine, for interpolating said digital pixel data using said plurality of combined filters and generating video data in at least three color planes and having said second vertical resolution.

19. A method for generating video signal, comprising:
generating digital pixel data representative of an image of a scene using an image sensor, said image sensor comprising a two-dimensional array of pixel elements overlaid with a pattern of a given number of selectively transmissive filters and having a first vertical resolution being an intermediate vertical resolution of vertical resolutions specified for a group of video formats;
storing said digital pixel data in a frame buffer;
processing said digital pixel data to generate video data in at least three color planes by interpolating said digital pixel data using a plurality of demosaic filters;
in response to a select signal having a first value selecting a first video format, processing said video data by upsampling or downsampling in the vertical direction to generate video data having a second vertical resolution associated with the first video format by interpolating said video data using a plurality of scaling filters; and
in response to said select signal having a second value selecting a second video format, processing said video data by upsampling or downsampling in the vertical direction to generate video data having a third vertical resolution associated with the second video format by interpolating said video data using a plurality of scaling filters;
wherein said plurality of demosaic filters and said plurality of scaling filters comprise at least one combined filter for interpolating said digital pixel data into video data in a first color plane and having said second or third vertical resolution said combined filter incorporating a demosaic filter and a scaling filter, and wherein said demosaic filter is an n×n' convolution kernel where n=n' or n≠n' said scaling filter is a 1×m convolution kernel and said combined filter is an n×(n'+m−1) convolution kernel.

20. The method of claim 19, wherein said group of video formats comprises NTSC and PAL video formats.

21. The method of claim 19, wherein said first vertical resolution comprises a value between said second vertical resolution and said third vertical resolution.

22. The method of claim 19, further comprising:
processing said video data using an image enhancement filter; and
encoding said video data as video signals in a corresponding one of said first and second video format.

23. The method of claim 22, further comprising:
after encoding said video signals for a first display field, returning to said processing said digital pixel data to generate video data in at least three color planes to generate video data for a second display field different than said first display field.

24. The method of claim 22, further comprising:
after encoding said video signals for a first display field, returning to said generating digital pixel data representative of an image of a scene to generate video data for a second display field different than said first display field.

25. A method for generating video signal, comprising:
generating digital pixel data representative of an image of a scene using an image sensor, said image sensor comprising a two-dimensional array of pixel elements overlaid with a pattern of a given number of selectively transmissive filters and having a first vertical resolution being an intermediate vertical resolution of vertical resolutions specified for a group of video formats;
storing said digital pixel data in a frame buffer;
in response to a select signal having a first value selecting a first video format, processing said digital pixel data by upsampling or downsampling in the vertical direction to generate video data in at least three color planes and having a second vertical resolution associated with the first video format by interpolating said digital pixel data using a plurality of combined filters, each of said combined filters incorporating a demosaic filter and a scaling filter; and
in response to said select signal having a second value selecting a second video format, processing said digital pixel data by upsampling or downsampling in the vertical direction to generate video data in at least three color planes and having a third vertical resolution associated with the second video format by interpolating said digital pixel data using a plurality of combined filters, each of said combined filters incorporating a demosaic filter and a scaling filter;
wherein said demosaic filter in each of said combined filters is an n×n' convolution kernel where n=n' or n≠n' said scaling filter is a 1×m convolution kernel and said combined filter is an n×(n'+m−1) convolution kernel.

26. The method of claim 25, wherein said group of video formats comprises NTSC and PAL video formats.

27. The method of claim 25, wherein said first vertical resolution comprises a value between said second vertical resolution and said third vertical resolution.

28. The method of claim 25, wherein each of said plurality of combined filters further incorporates an image enhancement filter.

29. The method of claim 25, further comprising:
encoding said video data as video signals in a corresponding one of said first and second video formats.

30. The method of claim 29, further comprising:
after encoding said video signals for a first display field, returning to said processing said digital pixel data to generate video data for a second display field different than said first display field.

31. The method of claim 29, further comprising:
after encoding said video signals for a first display field, returning to said generating digital pixel data representative of an image of a scene to generate video data for a second display field different than said first display field.

* * * * *